UNITED STATES PATENT OFFICE.

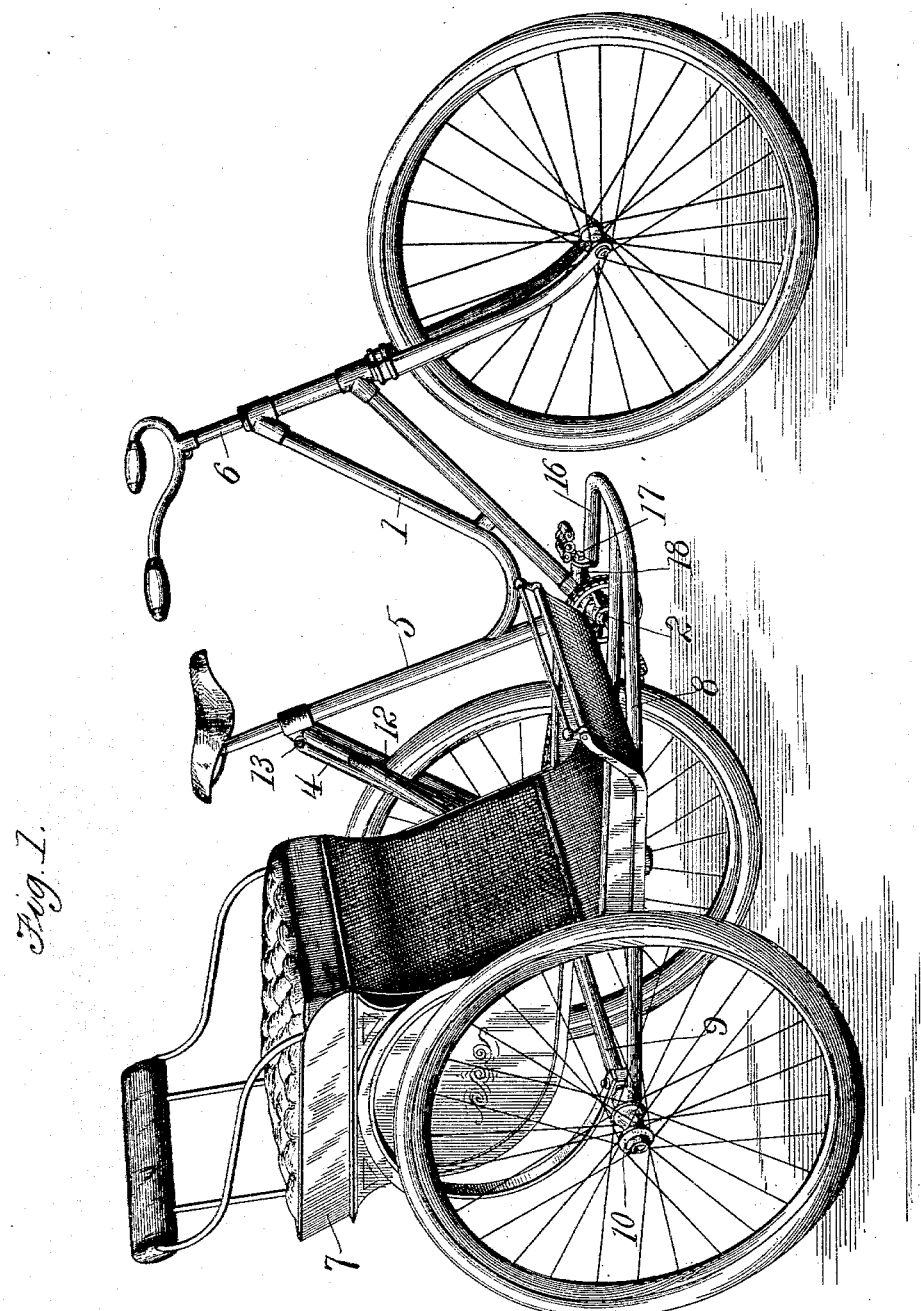

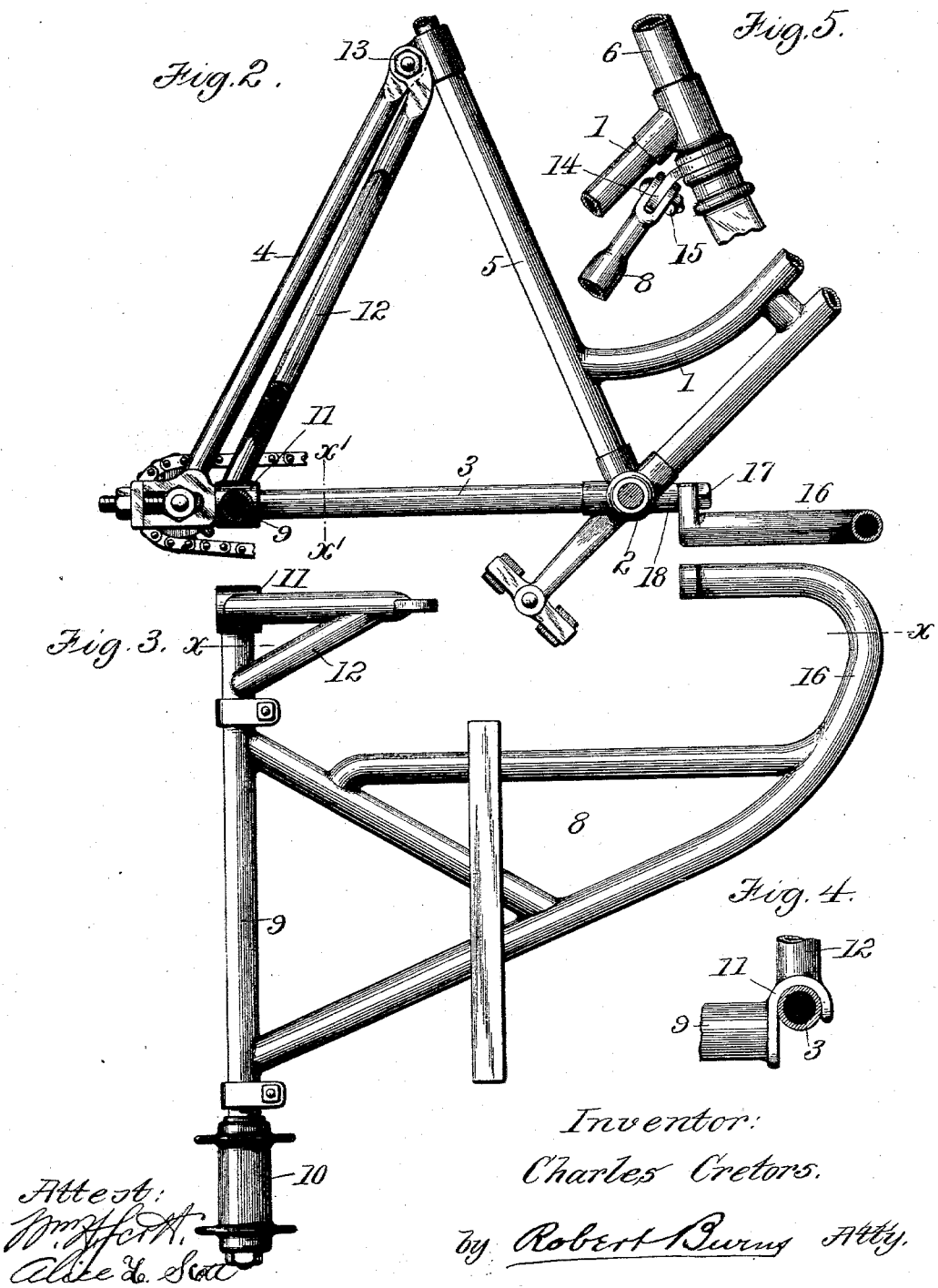

CHARLES CRETORS, OF CHICAGO, ILLINOIS.

VEHICLE ATTACHMENT FOR BICYCLES.

SPECIFICATION forming part of Letters Patent No. 592,963, dated November 2, 1897.

Application filed July 27, 1896. Serial No. 600,728. (No model.)

*To all whom it may concern:*

Be it known that I, CHARLES CRETORS, a citizen of the United States, residing at Chicago, in the county of Cook and State of Illinois, have invented a certain new and useful Improvement in Vehicle Attachments for Bicycles; and I do hereby declare the following to be a full, clear, and exact description of the same, reference being had to the accompanying drawings, forming a part of this specification.

The present invention relates to a vehicle attachment for safety-bicycles that enables a companion or goods, &c., to be carried in an easy and convenient manner.

The object of the present improvement is to provide a simple and efficient vehicle attachment for bicycles that is capable of ready and substantial attachment to and detachment from an ordinary safety-bicycle, the frame of such attachment being provided with a single outer wheel and a suitable vehicle-body, all as will hereinafter more fully appear, and be more particularly pointed out in the claims. I attain such objects by the construction and arrangement of parts illustrated in the accompanying drawings, in which—

Figure 1 is a perspective view illustrating the present invention with the vehicle attachment in the form of a single-seated buggy or other like carriage; Fig. 2, a detail longitudinal sectional elevation at line $x$ $x$, Fig. 3, showing the bicycle attached; Fig. 3, a detail plan view of the frame of the vehicle attachment separate from the bicycle; Fig. 4, a detail section at line $x'$ $x'$, Fig. 2; Fig. 5, a detail side elevation, illustrating a modified attachment of the vehicle attachment to the forward portion of the bicycle-frame.

Similar numerals of reference indicate like parts in the several views.

Referring to the drawings, 1 represents the usual frame of a safety-bicycle having the usual crank-hanger 2, rear forks 3 and 4, king-post or seat-post tube 5, and steering-post 6.

In the present improvement 7 is a vehicle-body of any usual and approved form, which is supported on a substantially triangular frame 8 of a skeleton formation and usually made of tubing, as shown, for the sake of combined strength and lightness. The rear end of this frame is formed by a laterally-extending axle 9, carrying on its outer end the supporting-wheel 10 and at its inner end provided with a yoke-shaped attaching-stirrup 11, that engages over one of the lower rear forks 3 to prevent lateral disengagement.

12 is a trussed hanger attached at its lower end to the axle 9 and to the stirrup 11, as shown, while at its upper end it is provided with an eye for the passage of the clamp-bolt 13 of the seat-post, by means of which it is securely attached in place at the side of such seat-post 5 and the upper rear fork 4. (See Fig. 2.) This hanger has a vertical arrangement, as shown, its lower end being attached to the inner end of the carrying-frame 8, while its upper end is attached to the upper end of the king-post or seat-post tube, as heretofore described, and as so arranged it acts as a suspension member for the inner end of the carrying-frame 8 and in turn transmits such load to the upper portion of the bicycle proper, such arrangement being found by practical use to be very effective in rendering the vehicle very light-running, in that all side strain is removed from the rear forks of the bicycle proper.

The front end of the carriage-frame 8 may be attached to any convenient part of the bicycle-frame proper. In Fig. 5 I have illustrated said frame as extending to near the steering-post 6 and clipped thereto by means of the lugged plate 14 on said post, to which the forward end of the carriage-frame is secured in a detachable manner by the attaching-bolt 15. My preferred mode of attachment for the forward end of the carriage-frame is illustrated in Figs. 1, 2, and 3. In this the front end of the frame is formed with a loop portion 16 to permit of the proper movement of the treadles of the bicycle, the free end of the loop being provided with an eye, through which passes an attaching-bolt 17, that secures the frame to a projecting lug 18 on the forward part of the hanger 2 of the bicycle-frame.

The leading advantage of the present improvement lies in the fact that the vehicle attachment can be readily detached from the bicycle when desired, so that the same can be used for ordinary bicycle-riding.

Having thus fully described my said invention, what I claim as new, and desire to secure by Letters Patent, is—

1. A vehicle attachment for bicycles, comprising a vehicle-body, a frame supporting the same and having a lateral axle, a wheel secured on the outer end of the axle, a vertically-arranged hanger, attached at its lower end to the inner end of the carrying-frame, and at its upper end to the upper part of the king-post, and means for securing the forward end of said frame to the forward portion of the bicycle-frame, substantially as set forth.

2. A vehicle attachment for bicycles, comprising a vehicle-body, a frame supporting the same, of a substantially triangular form, and having a lateral axle, a wheel secured to the outer end of said axle, a yoke or stirrup attached to the inner end of said axle, and adapted to engage one of the rear forks of a bicycle, a vertically-arranged hanger attached at its lower end to the inner end of the carrying-frame, and at its upper end to the upper part of the king-post, and means for securing the forward end of said frame, to the forward portion of the bicycle-frame, substantially as set forth.

3. A vehicle attachment for bicycles, comprising a vehicle-body, a frame supporting the same, and having a lateral axle, a wheel secured to the outer end of the axle, means for securing the inner end of the axle to the bicycle-frame, the forward portion of the supporting-frame having a looped portion, the free end of the loop being provided with an eye for the passage of the attaching-bolt by which the same is secured to the crank-axle hanger of the bicycle, substantially as set forth.

In testimony whereof witness my hand this 13th day of July, 1896.

CHARLES CRETORS.

In presence of—
ROBERT BURNS,
M. H. HOLMES.